(12) United States Patent
Lee (10) Patent No.: US 10,525,643 B2
(45) Date of Patent: Jan. 7, 2020

(54) METHODS FOR MAKING FOAM LAMINATES HAVING A CONCAVE SURFACE AND LAMINATES PRODUCED THEREBY

(71) Applicant: Covestro LLC, Pittsburgh, PA (US)

(72) Inventor: Bin Lee, Coraopolis, PA (US)

(73) Assignee: Covestro LLC, Pittsburgh, PA (US)

( * ) Notice: Subject to any disclaimer, the term of this patent is extended or adjusted under 35 U.S.C. 154(b) by 119 days.

(21) Appl. No.: 15/585,600

(22) Filed: May 3, 2017

(65) Prior Publication Data

US 2018/0319104 A1 Nov. 8, 2018

(51) Int. Cl.
| | | |
|---|---|---|
| *B29C 70/50* | (2006.01) | |
| *B29C 44/12* | (2006.01) | |
| *B32B 5/24* | (2006.01) | |
| *B32B 7/12* | (2006.01) | |
| *B29K 75/00* | (2006.01) | |

(Continued)

(52) U.S. Cl.
CPC ............. *B29C 70/50* (2013.01); *B29C 44/12* (2013.01); *B32B 5/245* (2013.01); *B32B 7/12* (2013.01); *B29K 2075/00* (2013.01); *B29K 2105/045* (2013.01); *B29L 2031/3005* (2013.01); *B32B 2266/0278* (2013.01); *B32B 2266/06* (2013.01); *B32B 2605/003* (2013.01)

(58) Field of Classification Search
CPC .......... B29C 45/14008; B29C 45/0005; B29C 45/1418; B29C 45/14221; B29C 45/14311; B29C 45/14631; B29C 45/72
See application file for complete search history.

(56) References Cited

U.S. PATENT DOCUMENTS

| | | |
|---|---|---|
| 4,052,241 A | 10/1977 | Walter |
| 4,863,791 A | 9/1989 | Steward et al. |

(Continued)

FOREIGN PATENT DOCUMENTS

| | | |
|---|---|---|
| DE | 19632055 C1 | 11/1997 |
| EP | 0993935 A2 | 4/2000 |
| EP | 1319554 A1 | 6/2003 |

OTHER PUBLICATIONS

Oertel, Gunter; Polyurethane Handbook; 2nd edition; pp. 178-186; (1994).

(Continued)

*Primary Examiner* — Stella K Yi
(74) *Attorney, Agent, or Firm* — Donald R. Palladino (57) ABSTRACT

Disclosed are methods for making foam laminates having a concave surface. The methods include: (a) placing the foam sheet-containing sandwich structure in a mold; and (b) shaping the laminate in the mold to form the foam laminate having a concave surface. In the methods, the foam sheet is a slice from a foam bun in which a foaming reaction occurs such that the foam rises in a direction away from a base, such that one major surface of the sheet is a foam rise direction facing surface and the opposed major surface of the sheet is a base facing surface, and prior to placing the foam laminate in the mold, the foam sheet is oriented so that the shaping forms the foam laminate having the concave surface wherein the foam rise direction facing surface of the foam sheet faces the concave surface of the foam laminate. Also disclosed are automotive headliners and hoodliners made thereby.

19 Claims, 5 Drawing Sheets

(51) Int. Cl.
*B29K 105/04* (2006.01)
*B29L 31/30* (2006.01)

(56) References Cited

U.S. PATENT DOCUMENTS

| | | | |
|---|---|---|---|
| 5,007,976 A * | 4/1991 | Satterfield | B29C 70/46 |
| | | | 156/222 |
| 5,273,698 A * | 12/1993 | Thary | B29C 43/184 |
| | | | 156/79 |
| 8,282,147 B2 | 10/2012 | Dong et al. | |
| 8,889,574 B2 | 11/2014 | Dolgopolsky et al. | |
| 2004/0146704 A1 | 7/2004 | Zolfaghari | |
| 2008/0227879 A1 | 9/2008 | Lee et al. | |
| 2012/0052283 A1 | 3/2012 | Gehani | |
| 2016/0355658 A1 | 12/2016 | Lee et al. | |

OTHER PUBLICATIONS

Dolgopolski, I. et al; Journal of Industrial Textiles, vol. 30, No. 1—Jul. 2000; "Polyurethane Foam as an Integal "Core" Component of Automotive Headliner".

* cited by examiner

METHODS FOR MAKING FOAM LAMINATES HAVING A CONCAVE SURFACE AND LAMINATES PRODUCED THEREBY

FIELD

The present specification is directed to, among other things, methods for making foam laminates that have a concave surface, such as, but not limited to, automotive headliners.

BACKGROUND

Water-blown open-celled polyurethane foams are used in many applications, such as, for example, in automotive hoodliners and headliners. Such foams are made by both continuous and discontinuous processes to form a foam bun.

In the discontinuous process, a water-blown polyurethane foam-forming composition is deposited, often by pouring, onto a base of a large, often rectangular, box and allowed to rise and form an open-celled polyurethane foam in the box. This process is often referred to as a "bun in the box". These buns, in many cases, can have a length of 6 to 11 feet (182 to 335 centimeters), a height of 3 to 4 feet (91 to 122 centimeters) and a width of 5 to 7 feet (152 to 213 centimeters), for example. Such a process is depicted, for example, Oertel, *Polyurethane Handbook* ($2^{nd}$ ed.) at p. 186 (1994).

In the continuous process, slabs of water-blown open-celled polyurethane foams are produced by pouring, or "laying down," the foam-forming composition on a continuously delivered base or substrate in which the foam rises to form a bun as it is conveyed along with the base. These "slabstock" foam buns, in many cases, can have a length of 100 to 200 feet (30.5 to 61 meters), a height of 3 to 4 feet (91 to 122 centimeters) and a width of 5 to 7 feet (152 to 213 centimeters), for example. Such a process is depicted, for example, Oertel, *Polyurethane Handbook* (2nd ed.) at p. 178-186 (1994).

For use in subsequent production of automotive hoodliners, headliners and sun shades, the bun, whether produced by a discontinuous or continuous process, is often sliced to form a foam sheet having a thickness of, for example, ¼ inch (0.32 centimeter) to 1 inch (2.5 centimeters). Automotive headliners that include a foam sheet produced from such processes are widely used. They typically have a sandwich structure in which the foam sheet has a fiber reinforced facing adjacent to each major surface of the foam sheet. The resulting sandwich is then formed in a mold to produce a foam laminate having a concave surface, typical of an automotive headliner.

There are several important properties that an automotive headliner should possess, including a desirable aesthetic appearance, structural stiffness, acoustical properties, and energy absorption. Among these, structural stiffness has become more and more important, particularly in the case of larger headliners, such as might be present in a sport utility vehicle or mini-van, for example, as more and more accessories are commonly attached to the headliner, including storage compartments, visors, electronic systems, and the like. Structural stiffness of the foam core, therefore, is very important, since it is a major component of the headliner. It is also often desirable, such as for cost reasons, to utilize lower density foams.

One area of difficulty in producing headliners from the processes described above is that both the foam density and foam stiffness can vary significantly from the top of the bun (the foam rise side) to the bottom of the bun (the base side). Typically, foam density is higher in the bottom portion of the bun but, perhaps counterintuitively, foam stiffness is also much lower in the bottom portion of the bun than other portions with lower foam densities, which may be due to differences in foam cell geometry and/or differences in the open cell content at the bottom of the bun. This reduced stiffness limits the possibility of using lower density foams in processes to produce automotive headliners.

As a result, it would be desirable to provide methods of producing foam laminates having a concave surface, which includes a foam sheet sliced from a foam bun produced by a discontinuous box foam process or a continuous slabstock process in which the stiffness of the foam in the laminate is sufficient regardless of the location from which the foam sheet was sliced from the bun, thereby potentially enabling the use lower density foams to produce such foam laminates, which may be embodied, for example, as an automotive headliner.

The present invention was made in view of the foregoing desire.

SUMMARY

In certain respects, the specification is directed to methods for making a foam laminate having a concave surface, comprising: (a) placing a foam sheet-containing sandwich structure into a mold; and (b) shaping the laminate in the mold to form the foam laminate having a concave surface, wherein (i) the foam sheet is a slice from a foam bun produced by depositing a foam-forming composition onto a base in which a foaming reaction occurs such that the foam rises in a direction away from the base, such that one major surface of the sheet is a foam rise direction facing surface and an opposed major surface of the sheet is a base facing surface, and (ii) the foam laminate is oriented in the mold so that the shaping forms the foam laminate having the concave surface wherein the foam rise direction facing surface of the foam sheet faces the concave surface of the foam laminate.

In other respects, the specification is directed to methods for making a foam laminate having a concave surface comprising: (a) producing a foam bun by depositing a foam-forming composition onto a base such that as a foam-forming reaction occurs the foam rises in a direction away from the base; (b) slicing the foam bun to produce a foam sheet having two opposed major surfaces, wherein one major surface of the sheet is a foam rise direction facing surface and the other major surface is a base facing surface; (c) placing a laminate comprising the foam sheet and a facing attached to each of the two opposed major surfaces into a mold; and (d) shaping the laminate in the mold to form the foam laminate having a concave surface, wherein, prior to placing the laminate in the mold, the foam bun or the foam sheet is re-oriented so that when the laminate is placed in the mold and shaped, the shaping forms the foam laminate having the concave surface wherein the foam rise direction facing surface of the foam sheet faces the concave surface of the foam laminate.

The specification is also directed to, among other things, foam laminates, including automotive headliners and hoodliners, made from such processes.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As indicated, certain embodiments of the methods of the present specification are directed to methods for making a foam laminate having a concave surface. As used herein, the term "foam laminate" refers to an article having a sandwich structure in which a foam core comprising a foam sheet having two major opposed surfaces is sandwiched between one or more layers that are adhered to at least one of the opposed surfaces of the foam sheet. For example, in some embodiments, the foam laminate comprises a foam sheet, an adhesive layer in contact with and attached to one or both major opposed surfaces of the foam sheet, and a fiber containing layer in contact with and adhered to the adhesive layer. As used herein, the term "concave surface" means a surface with an inwardly curving shape.

In certain embodiments, the foam sheet comprises an open-celled polyurethane foam. As used herein, the term "open-celled polyurethane foam" refers to a polyurethane foam having an open-cell content of at least 60% by volume, such as at least 75% by volume, such as 60 to 99% or 75 to 99% by volume, measured according to ASTM D6226-15. In certain embodiments, the open-celled polyurethane foams have a density of at least 10 $kg/m^3$, such as at least 15 $kg/m^3$, or, in some cases, at least 20 $kg/m^3$ and/or up to 50 $kg/m^3$, such as up to 45 $kg/m^3$ or, in some cases, up to 35 $kg/m^3$ according to ASTM D1622/D1622M-14. In some embodiments, the open-celled polyurethane foams have a density of 20 $kg/m^3$ to 30 $kg/m^3$, such as 23 $kg/m^3$ to 27 $kg/m^3$.

In certain embodiments, the foam core comprises a foam sheet having two major opposed surfaces and which is a slice from a foam bun produced by depositing a foam-forming composition onto a base in which a foaming reaction occurs such that the foam rises in a direction away from the base, such that one major surface of the sheet is a foam rise direction facing surface and an opposed major surface of the sheet is a base facing surface. In certain embodiments, the foam sheet has a thickness of, for example, ¼ inch (0.32 centimeter) to 1 inch (2.5 centimeters). In certain embodiments, the sheet is sliced from a foam bun having a length of 5 to 11 feet (152 to 335 centimeters), a height of 3 to 4 feet (91 to 122 centimeters), and/or a width of 5 to 7 feet (152 to 213 centimeters).

The foam buns suitable for use in preparing the foam sheets used in the methods of the present specification can be produced by a discontinuous process or by a continuous process.

As used herein, the term "discontinuous" is synonymous with batch and refers to a method in which a container takes in all of the reactants of a foam-forming composition and then a foam, such as an open-celled polyurethane foam, is formed in the container, and, during the period of this process, no reactants are fed into or removed from the container. The discontinuous method is not a continuous method of foam production, in which a reaction mixture is applied to a moving base, such as a film disposed on a conveyor belt, and allowed to foam on the base. As used herein, "container" refers to a receptacle for holding the foam-forming composition, such as a polyurethane foam-forming composition, during the foaming process. The containers used may, in certain embodiments, be in the form of a box, which, as used herein, refers to a container in the form of a square or rectangle, that is formed by a base, such as a tray, and a plurality of side walls, such as at least 3 or at least 4 side walls, and which may or may not have a cover or lid. The base of the container may be gas-permeable, which means that the base, such as a tray, is disposed such that gas, such as air, can pass through the base to some extent and is constructed of a material through which gas, such as air, can pass to some extent, examples of which include, but are not limited to, paper or cardboard, or a gas-permeable plastic film, such as a polymeric film, containing pinholes to make the film gas-permeable. In some cases, the container may include means for produced a bun with a hole extending therethrough, such as may be desirable when the resulting headliner is desired to shaped to accept a sun-roof.

In certain embodiments of the discontinuous process, a water-blown polyurethane foam-forming composition is deposited, often by pouring, onto the base of the container, which is often a large, often rectangular, box and allowed to rise and form an open-celled polyurethane foam in the box. In certain embodiments, the foam bun produced from such a process has a length of 6 to 9 feet (182 to 274 centimeters), a height of 3 to 4 feet (91 to 122 centimeters) and/or a width of 5 to 7 feet (152 to 213 centimeters).

A discontinuous process suitable for making a foam bun used in certain methods of the present specification is described and depicted in Oertel, *Polyurethane Handbook* (2nd ed.) at p. 186 (1994), the cited portion of which being incorporated herein by reference.

In other embodiments, the foam bun is produced by a continuous process in which a reaction mixture is applied, such as by pouring, to a moving base, such as a film disposed on a conveyor belt, and allowed to foam on the base. In certain embodiments, the resulting "slabstock" foam bun has a length of 100 to 200 feet (30.5 to 61 meters), a height of 3 to 4 feet (91 to 122 centimeters) and a width of 5 to 7 feet (152 to 213 centimeters). The bun is then cut into a short length of, for example, 5 to 9 feet (152 to 274 centimeters), prior to further processing. A continuous process suitable for making a foam bun used in certain methods of the present specification is described and depicted in Oertel, *Polyurethane Handbook* (2nd ed.) at p. 178-186 (1994), the cited portion of which being incorporated herein by reference.

Whether produced by a discontinuous or continuous process, the foam bun often has a density that varies along the height thereof. For example, in some embodiments, the foam density at the bottom side of the bun, i.e., those portions of the bun that are at a height of 30% or, in some cases, 20% or less than the total height of the bun (measured from the base side of the bun) can have a density of, for example, 2-3 $kg/cm^3$ greater than the density of the bun at other heights, including portions of the bun that are at a height of at least 50% of the total height of the bun (measured from the base side of the bun).

As indicated, in addition to the core comprising the foam sheet, some embodiments of the foam laminates produced according to the methods of the present specification comprise an adhesive layer in contact with and attached to one or both major opposed surfaces of the foam sheet, and a fiber containing layer in contact with and adhered to the adhesive layer(s), such as is the case with automotive headliners and hoodliners.

In certain embodiments, the adhesive layer(s) comprise a polymer, examples of which include, but are not limited to, polyolefins (such as polyethylene and polypropylene), polyesters, nylons, poly(vinyl chloride), polyureas (such as the reaction product of water and an isocyanate), polyurethanes, polyacrylics, latex, styrene-butadiene polymers, nitrile-butadiene polymers, silicone polymers, mixtures thereof, copolymers thereof and interpenetrating networks thereof. In certain embodiments, each adhesive layer, if two or more adhesive layers are present, comprise the same polymer.

The fiber containing layer(s) can comprise woven or non-woven fibers. The fibers of the fiber containing layer(s) may be in the form of, for example, chopped fibers, such as synthetic or natural fibers, including glass fibers, for example.

As will be appreciated, the foam laminates produced according to the methods of the present specification may comprises additional layers, such as, for example, a textile cover layer which may be attached to a flexible foam layer that is adhered to one of the fiber containing layers and a scrim layer attached to the other fiber-containing layer, as is typical, for example, of an automotive headliner configuration.

As indicated, in certain embodiments, the foam laminate produced according to the methods of the present specification comprise a foam sheet that is a slice from the foam bun produced by depositing a foam-forming composition onto a base in which a foaming reaction occurs such that the foam rises in a direction away from the base, such that one major surface of the sheet is a foam rise direction facing surface and an opposed major surface of the sheet is a base facing surface.

As indicated, in certain embodiments, the foam-forming composition used in the methods of the present specification is a polyurethane foam-forming composition. As will be appreciated, such compositions comprise a polyol component and a polyisocyanate component. More specifically, in certain embodiments of the methods of the present specification, open-celled polyurethane foams are obtained by reacting a polyisocyanate component with a polyol component which comprises: (a) a polyether polyol having a functionality of from 2 to 6 and a number average molecular weight of more than 160 to 6500, such as where at least 60% by weight, at least 80% by weight or, in some cases, at least 90% by weight, based on total weight of polyol in the polyol component, is one or more such polyether polyol(s), (ii) a chain extending agent and/or crosslinking agent containing at least two isocyanate-reactive groups and having a molecular weight of from 60 to 160, (iii) water, and (iv) a catalyst for polyurethane formation.

The polyisocyanate component comprises one or more polyisocyanates, but, in certain embodiments, comprises diphenyl methane diisocyanate (mMDI), polyphenyl polymethylene polyisocyanate (pMDI) or a mixture of one or more diphenyl methane diisocyanates and one or more polyphenyl polymethylene polyisocyanates. In certain embodiments, mixtures of a diphenyl methane diisocyanate and a polyphenyl polymethylene polyisocyanate in which from 40 to 85% by weight of the total polyisocyanate is a diphenyl methane diisocyanate and from 15 to 40% of the total polyisocyanate is a polyphenyl polymethylene polyisocyanate, is used. In certain embodiments, 40 to 80% by weight, such as 45 to 75% by weight, of the total monomeric diphenyl methane diisocyanate isomers include 4,4'-, 2,2'- and/or 2,4'-diphenyl methane diisocyanate.

As indicated, in certain embodiments, the polyol component comprises a polyether polyol having a functionality of from 2 to 6. In certain embodiments, the polyol component includes at least 60% by weight of a polyether polyol, such as at least 80% by weight, or, in some cases, at least 90% by weight, of a difunctional, trifunctional or mixture of di- and tri-functional hydroxyl polyethers having an OH number of from 26 to 1050 (these OH numbers correspond to a number average molecular weight of from more than 160 to 6,500 determined by the end group analysis method).

In certain embodiments, the polyol component also comprises up to 40% by weight, such as up to 25% by weight, or, in some cases, up to 10% by weight, based on total weight of polyol, of other types of polymeric polyols such as polyester polyols and polymer filled polyols.

Examples of difunctional hydroxyl polyethers having an OH number of from 26 to 1050 which may be used in the polyol component include the difunctional polyethers obtained by reaction of ethylene oxide and/or propylene oxide with glycols such as ethylene glycol, diethylene glycol, 1,2- or 1,3-propylene glycol, butane-1,4-diol, etc. Polypropylene oxides and/or polyethylene oxides having an OH number in this range, in some cases in the range of from 147 to 560 (corresponding to a number average molecular weight of from 200 to 763 as determined by the end group analysis technique) are examples of suitable difunctional hydroxyl polyethers. These short chained polyethers are, in certain embodiments, used in an amount of from 15 to 35% by weight, based on the total weight of the polyol component.

Trifunctional hydroxyl polyethers which may be employed in the polyol component include the trifunctional polyethers obtainable by reaction of ethylene oxide or propylene oxide with trihydric alcohols, such as glycerol, trimethylol propane, monoethanolamine, triethanolamine, sucrose/propylene, glycol/water, etc. These polyethers often have an OH value of 26 to 1050 which corresponds to a number average molecular weight of from more than 160 to 6,500 as determined by the end group analysis method.

In certain embodiments, the polyol component comprises a mixture of difunctional and trifunctional hydroxyl polyethers. In certain embodiments, the polyol component comprises (i) 15 to 40% by weight, based on the total weight of the polyol component, of a polypropylene oxide-based polyether diol, such as a propylene glycol initiated polyether diol, having an OH number in the range of from 450 to 600, (ii) 30 to 50% by weight, based on the total weight of the polyol component of a poly(propylene/ethylene oxide) glycerin-initiated polyether triol having an OH number in the range of from 26 to 34; and (iii) 10 to 30% by weight, based on the total weight of the polyol component, of a polypropylene oxide-based polyether triol, such as a glycerin-initiated polyether triol, having an OH number in the range of from 400 to 550, such as 445 to 495. Suitable polyethers polyols also include filler-containing polyethers which contain approximately 20% by weight of a solid styrene/acrylonitrile copolymer grafted on or approximately 20% by weight of a solid reaction product of toluene diisocyanate (TDI) and hydrazine in dispersed form.

The polyol component may comprise a chain extending agent and/or crosslinking agent containing at least two isocyanate-reactive groups and having a molecular weight of from 60 to 160, specific examples of which include, but are not limited to, glycerine, butanediol, ethylene glycol, diethylene glycol, propylene glycol, ethylenediamine, ethanolamine, triethanolamine, trimethylolpropane and pentaerythritol, including mixtures of two or more thereof. In certain embodiments, such a chain extending agent and/or crosslinking agent is present in an amount of at least 1% by weight, such as at least 5% by weight and/or up to 20% by weight or, in some cases, up to 10% by weight, based on the total weight of the polyol component.

In certain embodiments, the polyol component also comprises a blowing agent comprising water. In addition to water, other blowing agents may also be used, such as, for example, hydrocarbons, hydrofluorocarbons, including, but not limited to, $C_3$ and $C_4$ polyfluoroalkanes and polyfluoroalkenes (including, but not limited to, any isomers of 1-chloro-3,3,3-trifluoropropene and 2-chloro-3,3,3-trifluoropropene), including hydrochlorofluorocarbons. In certain embodiments, water is included in an amount of 1 to 9% by weight, such as 2.5 to 7% by weight, or, in some cases, 3 to 6% by weight, based on total weight of the polyol component. If any other blowing agents are included, such other blowing agent are often not be employed in an amount greater than 2% by weight. In certain embodiments, water is the sole blowing agent used in the polyurethane foam-forming composition.

In certain embodiments, the polyol component also comprises a foam stabilizer and/or a cell opener, such as where the polyol component comprises 0.01 to 2% by weight, such as 0.1 to 0.7% by weight, of a foam stabilizer and/or cell opener based on the total weight of the polyol component. Any foam stabilizer and/or cell opener is suitable, such as, for example, silicone foam stabilizers, such as those having a relatively short polyether group and a relatively long silicone group.

In certain embodiments, the polyol component comprises a catalyst for polyurethane formation, such as a modified amine catalyst, such as where the modified amine catalyst is included in an amount of from 0.5 to 8% by weight, such as 1 to 5% by weight, or, in some cases, 2 to 4% by weight, based on total weight of the polyol component.

In certain embodiments, the modified amine catalyst comprises the reaction product of (1) an amine, such as an amine having at least two amino groups, with at least one of those amino groups being a tertiary amino group with (2) an oil, such as a bio-based oil or a derivative thereof having a molecular weight of 500 to 800. In certain embodiments, the modified amine catalyst comprises a reaction product of (1) amines such as those represented by the formula $R_2$—N—R'x-$NH_2$ where R and R' each represents a hydrocarbon and x represents an integer, such as N,N-dimethyl-propylene diamine with (2) an oil, such as castor oil or any fatty acid, such as tall oil. In certain embodiments, the modified amine catalyst is a reaction product of N,N-dimethyl-propylene diamine with tall oil.

In addition to or, in some cases, in lieu of, the aforedescribed modified amine catalyst, the polyol component may comprise other known catalyst(s) for polyurethane formation.

Other known auxiliaries and additives may also be used, examples of which include, for example, surface-active additives, such as emulsifiers; cell regulators, such as paraffins, fatty alcohols and dimethyl polysiloxanes; pigments or dyes; flameproofing agents such as trischloroethyl phosphate and tricresyl phosphate and expandable graphite; stabilizers against the effects of ageing and weathering; plasticizers; fungistatic and bacteriostatic agents; and fillers, such as barium sulfate and polyethylene powder.

In certain embodiments, the polyol component is mixed with the polyisocyanate component in a ratio by weight of isocyanate to polyol (referred to herein as "A/B Ratio") of from 140:100 to 200:100. In certain embodiments, the polyol component and the polyisocyanate component are mixed in a ratio such that the NCO/OH index is 60 to 130, such as 85 to 125 or, in some cases, 100 to 120.

In certain embodiments, the polyurethane-foam forming composition is allowed to form an open-celled polyurethane foam on the base. In certain embodiments, the foamable mixture is activated so that the foaming reaction begins in 30 to 60 seconds, as measured from the emergence of the first amount of the foam-forming composition from a mixing head (referred to as "cream time"). In certain embodiments, after 150 to 200 seconds, as measured from the emergence of the first amount of the foam-forming composition from the mixing head, the foam gels (referred to as "gel time") and, after 3 to 5 minutes, as measured from the emergence of the first amount of the foam-forming composition from the mixing head, the degas process occurs, i.e. the sudden evaporation of a mixture of steam and $CO_2$, leaving a number of small craters on the surface of the slab. This blow-out process is the outward sign that the foam cells have opened, thereby forming an open-celled polyurethane foam.

The foams can, in some cases, have a glass transition temperature of about 150° C. and, hence, high heat resistance and can have almost no resilience, due to high open cell content, so that edges which are tightly compressed to different extents retain their cross-section. This compression retention ensures an exact fit of the parts required during installation.

After producing the foam bun, whether by a discontinuous or continuous process, the bun is typically allowed to cool, often for 2 days or more, prior to further processing.

As indicated earlier, certain methods of the present specification comprise placing a foam sheet-containing sandwich structure into a mold. The foam laminate is, in certain embodiments, produced by a cold forming or thermoforming process whereby foam sheets produced by slicing the discontinuously or continuously produced foam bun, are first at least partially coated on at least one major surface thereof with an adhesive, such as any other those adhesives described above. Additional layers of the sandwich structure, such as the fiber containing layer(s) are then applied. The foam sheet-containing sandwich structure is then shaped in a mold to form the foam laminate having a concave surface. In the cold forming process, the sandwich structure is transferred to a compression molding press in which in-mold times may range from, for example, 45 second to 2 minutes and the platens of the mold may be heated to, for example, 90 to 130° C. Pressure is then applied to help the adhesive penetrate into the foam and the applied heat accelerates adhesive curing and bonds the foam to the fiber containing layer(s). Under these conditions of pressure and heat, the laminate is formed into the desired shape. In a thermoforming process, the foam-containing sandwich structure is first heated in an oven at, for example, 160-200° C. and then shaping occurs in a mold at a lower temperature, such as 40-60° C., at an in-mold time of, for example, 45 to 90 seconds.

A critical feature of the methods of the present specification is that prior to placing the foam laminate in the mold, the foam laminate is oriented so that the shaping forms the foam laminate having the concave surface wherein the foam rise direction facing surface of the foam sheet faces the concave surface of the foam laminate. In a typical discontinuous or continuous foam bun producing process, the foam bun is sliced standing up at the foam rise direction and the resulting foam sheet is thereafter transferred to the mold in the same orientation as it was sliced, such that, upon forming, the foam rise direction faces away from the concave surface of the resulting foam laminate. It has been discovered, however, that such foam sheets can be unexpectedly much stiffer on the opposite base facing surface of the foam sheet and, surprisingly, this stiffness is relatively consistent for slices taken throughout the entire height of the foam bun. Therefore, it is believed that by re-orienting, such as flipping, the foam bun or foam slice and inserting the foam laminate into the mold such that the foam rise direction faces the concave surface of the resulting concave surface-containing foam laminate, variations in foam stiffness can be reduced significantly based on the location from which the foam slice was taken from the bun. As a result, it is believed that foams having lower density, but sufficient stiffness, can be produced using the methods of the present specification. The present process can be particularly beneficial when using foam slices taken from the bottom portion of the bun, such as, for example, slices taken from the bottom 30%, bottom 20%, or bottom 10% of the height of the bun, proximate to the base side of the bun. The foregoing flipping action may occur before or after the bun has been sliced, though in some cases it may be preferable to flip the bun before it is sliced, particularly in the case of lower density buns that can be flipped more easily or which are more likely to tear or break if flipped after the slicing step.

As will be appreciated from the foregoing, certain methods of the present specification are directed to methods for making a foam laminate having a concave surface comprising: (a) producing a foam bun by depositing a foam-forming composition onto a base such that as a foam-forming reaction occurs the foam rises in a direction away from the base; (b) slicing the foam bun to produce a foam sheet having two opposed major surfaces, wherein one major surface of the sheet is a foam rise direction facing surface and the other major surface is a base facing surface; (c) placing a laminate comprising the foam sheet and a facing attached to each of the two opposed major surfaces into a mold; and (d) shaping the laminate in the mold to form the foam laminate having a concave surface, wherein, prior to placing the laminate in the mold, the foam bun or the foam sheet is re-oriented so that when the laminate is placed in the mold and shaped, the shaping forms the foam laminate having the concave surface wherein the foam rise direction facing surface of the foam sheet faces the concave surface of the foam laminate.

As will also be appreciated from the foregoing, certain methods of the present specification are directed to method for making a foam laminate having a concave surface comprising shaping the laminate in a mold to form the concave surface, wherein: (a) the foam in the laminate is a sheet having opposed major surfaces, (b) the sheet is a slice from a foam bun that is made by depositing a foam-forming composition onto a base, wherein as a foaming reaction occurs the foam rises in a direction away from the base, such that one major surface of the sheet is a foam rise direction facing surface and the opposed major surface of the sheet is a base facing surface; and (c) the foam laminate is oriented in the mold so that the shaping produces a foam laminate in which the foam rise direction facing surface of the foam sheet faces the concave surface of the foam laminate.

As will also be appreciated from the foregoing, the present specification is also directed to automotive headliners and/or hoodliners made by the processes described in this specification and comprising the various features and layers described in this specification. These automotive headliner or hoodliner have a concave surface and comprise: (a) a core comprising a foam sheet comprising two major opposed surfaces; (b) an adhesive layer in contact with and attached to one or both major opposed surfaces of the foam sheet; and (c) a fiber containing layer in contact with and adhered to the adhesive layer, wherein the a foam rise direction facing surface of the foam sheet faces the concave surface of the headliner or hoodliner.

The non-limiting and non-exhaustive examples that follow are intended to further describe various non-limiting and non-exhaustive embodiments without restricting the scope of the embodiments described in this specification.

EXAMPLES

The materials used in the Examples were as follows:
POLYOL A: A glycerin-initiated polyether polyol having a functionality of 3 and a molecular weight of approximately 6000.
POLYOL B: A propylene glycol initiated polyether polyol having a functionality of 2 and a molecular weight of 218.
POLYOL C: A glycerin-initiated polyether polyol having a functionality of 3 and a molecular weight of 358.
CATALYST: A modified amine catalyst of the type described in U.S.
Patent Application Publication No. 2008/0227879 A1.
STAB: A cell stabilizer
CROSS: A crosslinking agent
$H_2O$: Water, the blowing agent.
COLOR: a black paste
ISO: A mixture of diphenyl methane diisocyanate and a polyphenyl polymethylene polyisocyanate in which from 10 to 50% by weight of the total polyisocyanate is a diphenyl methane diisocyanate and from 50 to 90% of the total polyisocyanate is a polyphenyl polymethylene polyisocyanate.

Examples 1-2

The materials listed in Table 1 (in parts by weight) were combined in the amounts indicated (in parts by weight). The polyols and additives were combined to form the polyol component before being combined with the polyisocyanate component in a suitable container. The polyol component and polyisocyanate component were combined at various ratios to provide various ISO/OH Indexes. Both the polyol component and the polyisocyanate components were adjusted to a temperature of 24.5° C. to 25.5° C. The polyol component was charged to the container first, and then the polyisocyanate component was added. The resulting foam-forming composition was mixed with a high speed mixer at 2700 to 2900 rpm. The timer was started at the beginning of the mixing.

TABLE 1

| Ingredient | Example 1 | Example 2 |
| --- | --- | --- |
| POLYOL A | 39 | 39.1 |
| POLYOL B | 27.75 | 18.7 |
| POLYOL C | 18 | 28 |
| CROSS | 7.6 | 7.6 |
| CATALYST | 2.75 | 2.2 |
| $H_2O$ | 4.1 | 4.1 |
| STAB | 0.3 | 0.3 |
| COLOR | 0.5 | — |
| A/B Ratio[1] | Various | Various |

[1]Relative amounts by weight of the isocyanate component to polyol component.

Foam Testing

For each test, after about 20 seconds of mixing, approximately 1000 grams of the foam-forming composition was poured into a 12"×12"×12" (30.5 cm×30.5 cm×30.5 cm) wooden box that had a plastic lining and a cardboard base. The resulting foam bun was removed from the box and trimmed to provide a 11"×11"×6.5" (28 cm×28 cm×16.5 cm) foam block, which was then weighed to record the foam density. The block was then laid on its side and, starting from the top, the block was cut into slices of 10 millimeter thicknesses, which resulted in 13-14 slices being produced from the block. Slices #3 (top), #8 (mid) and #13 (bottom) were evaluated for stiffness.

Figure 1:
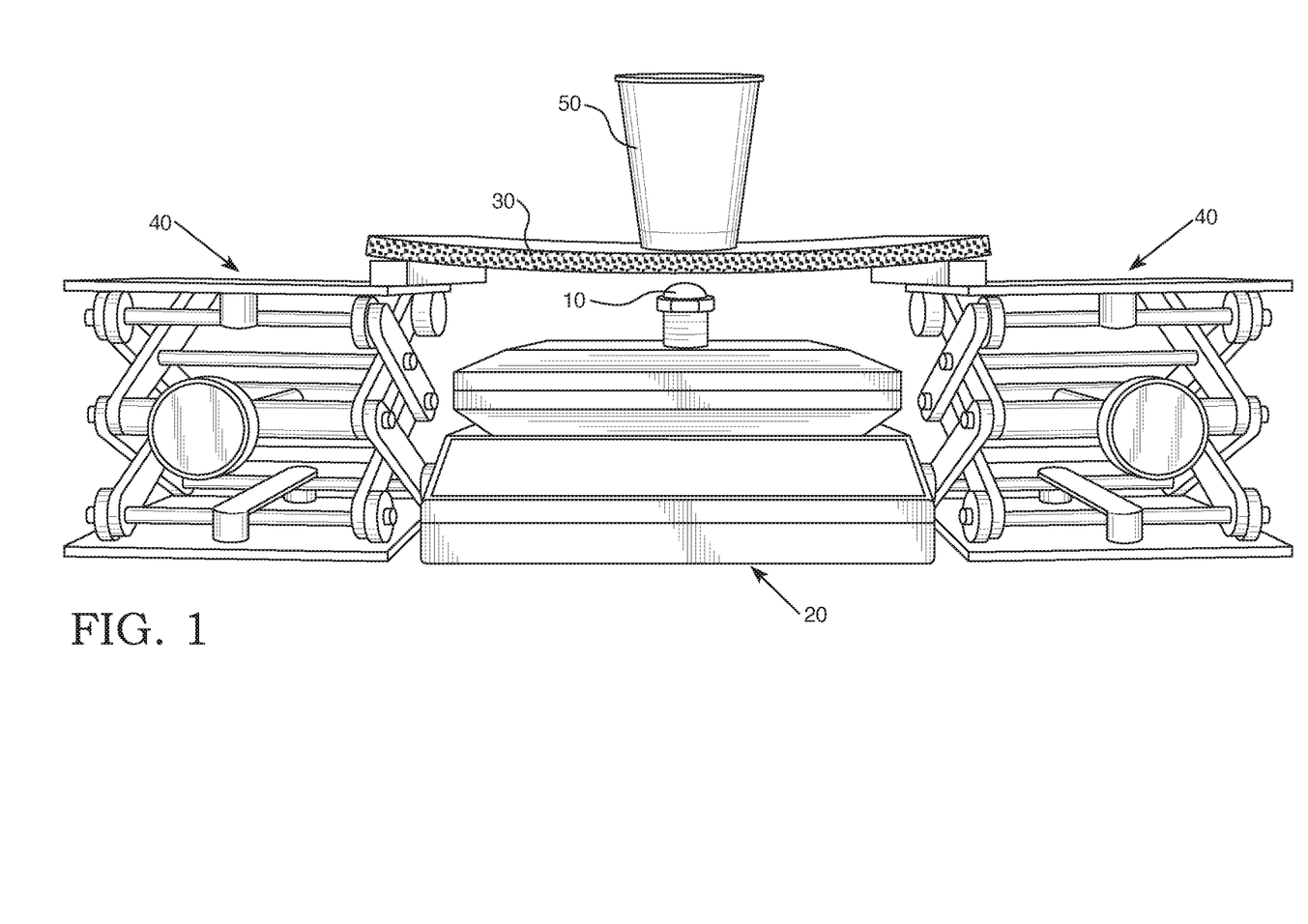
FIG. 1 illustrates the equipment set-up used to measure foam stiffness of the foams tested in the Examples.
Figure 2A:
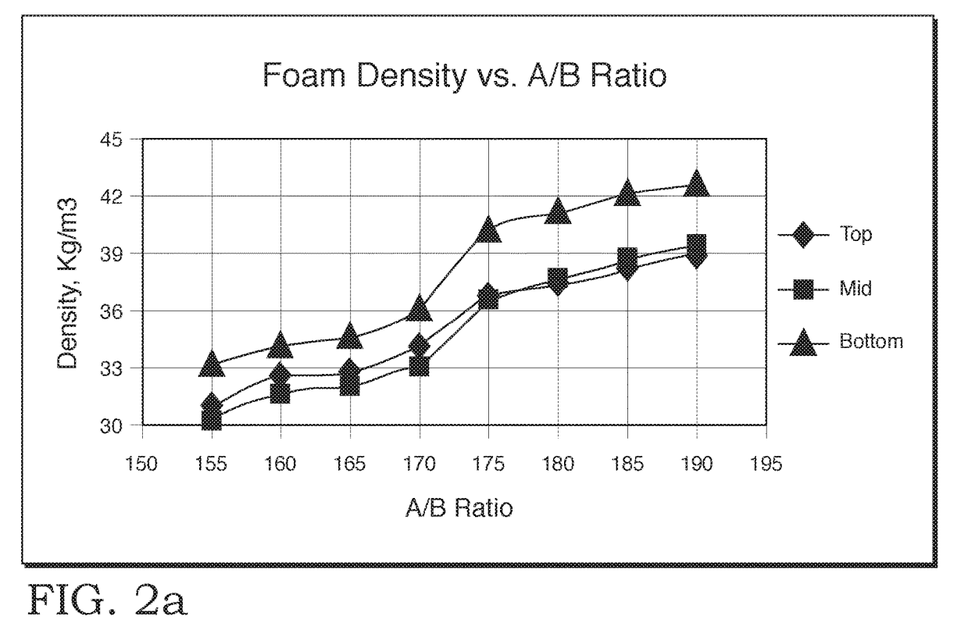
FIGS. 2(a) to 2(d) are charts of foam density vs. A/B Ratio and deflection weight vs. A/B Ratio of the Examples using the foam-forming composition of Example 1.
Figure 2B:
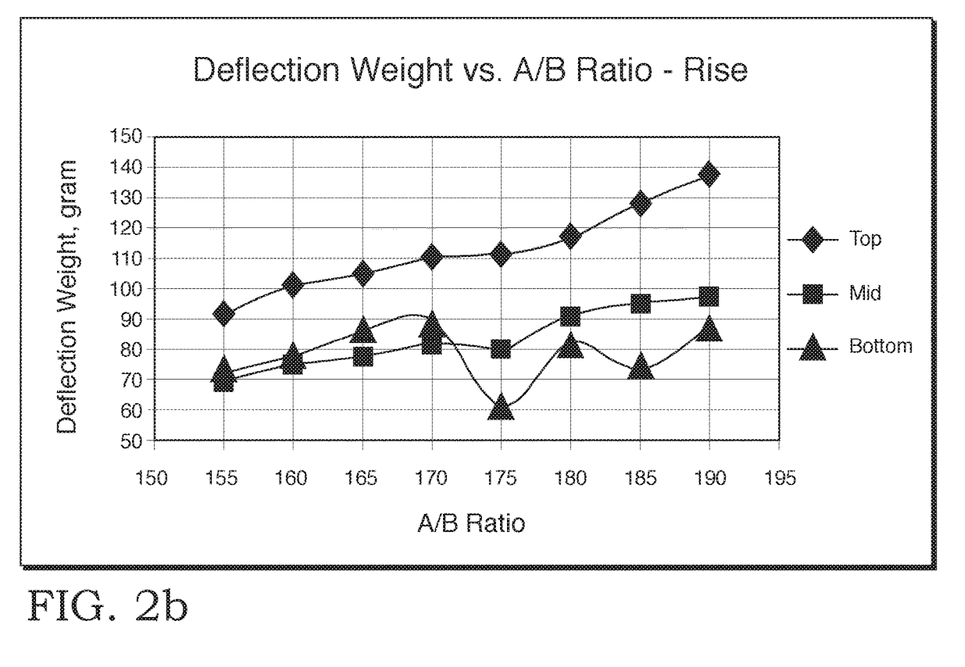
Figure 2C:
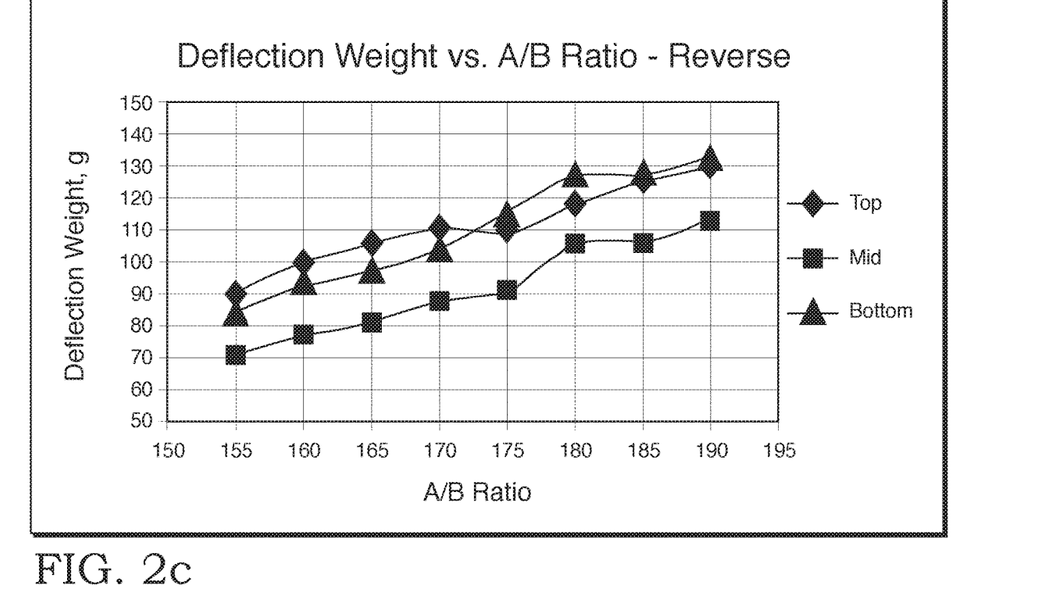
Figure 2D:
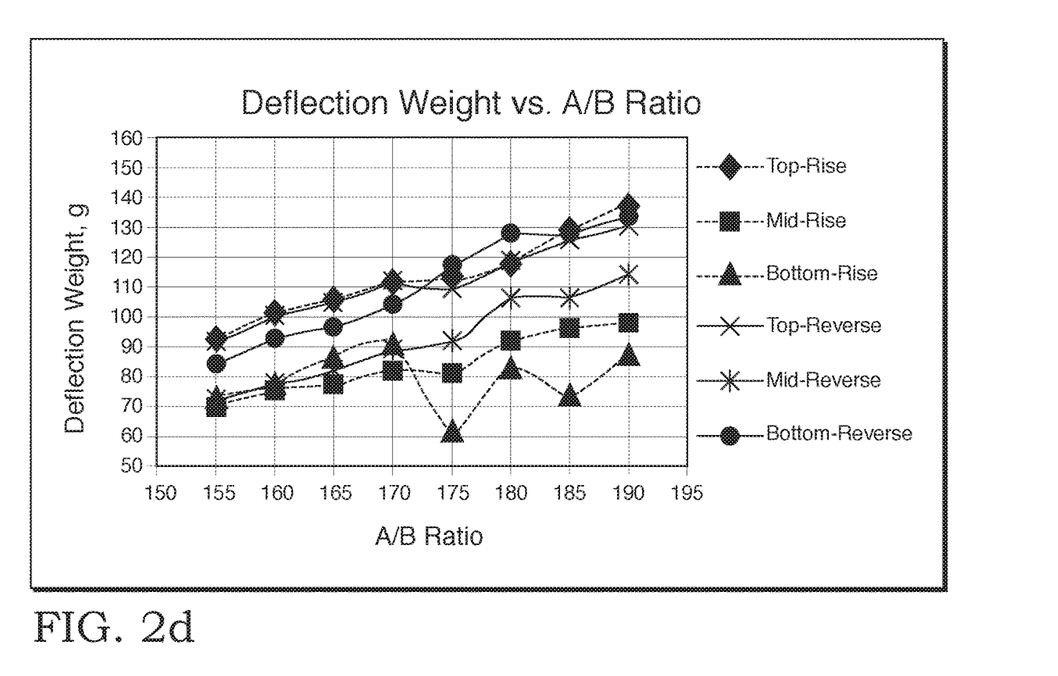
Figure 3A:
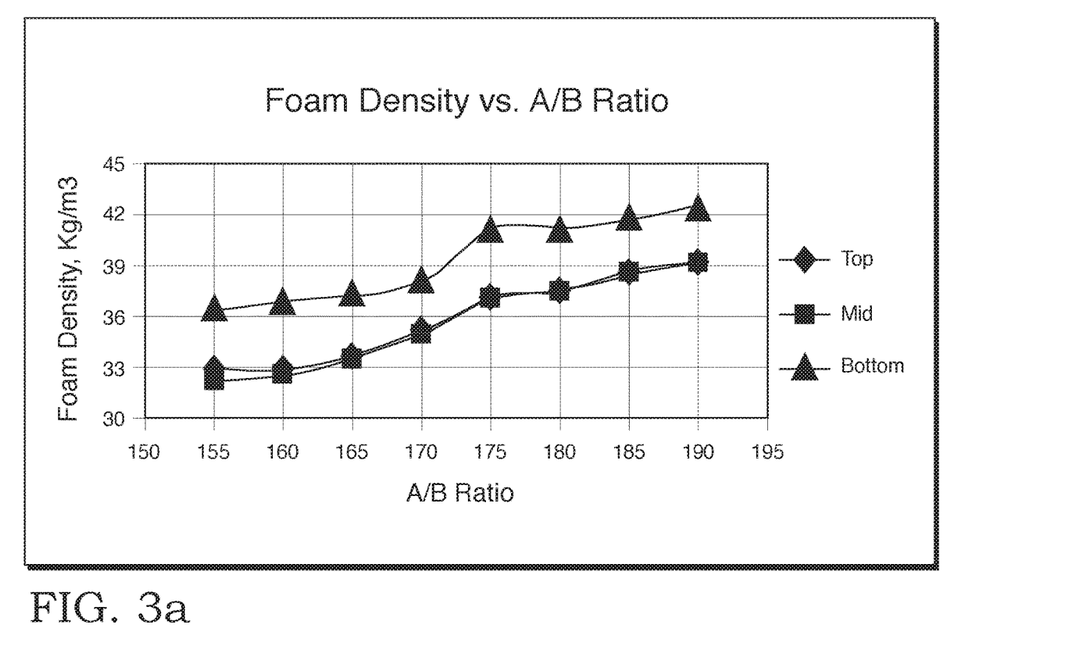
FIGS. 3(a) to 3(d) are charts of foam density vs. A/B Ratio and deflection weight vs. A/B Ratio of the Examples using the foam-forming composition of Example 2.
Figure 3B:
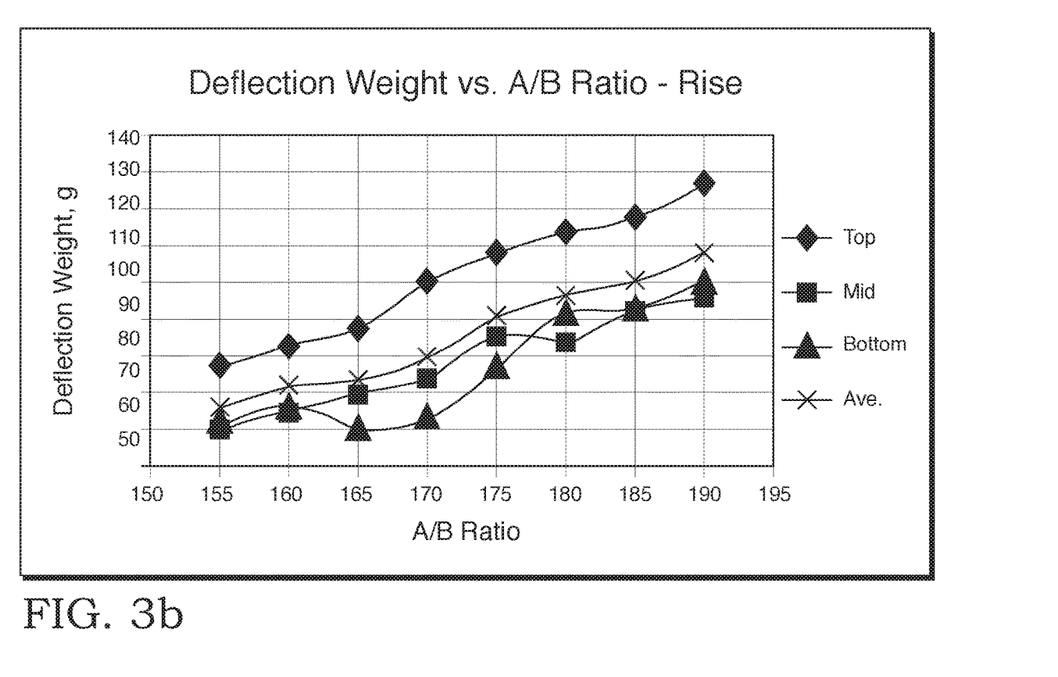
Figure 3C:
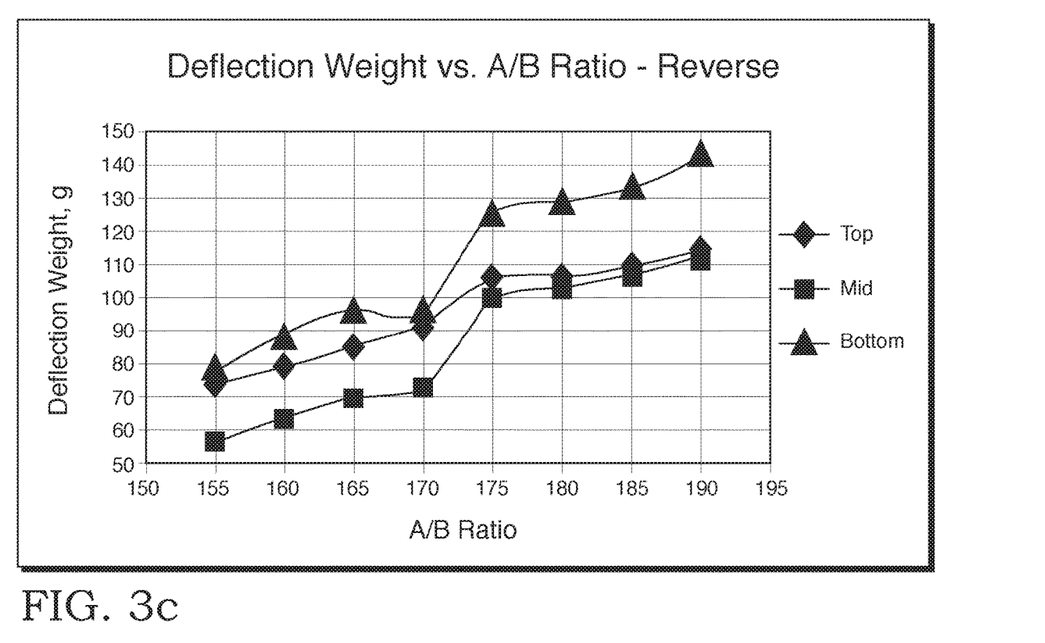
Figure 3D:
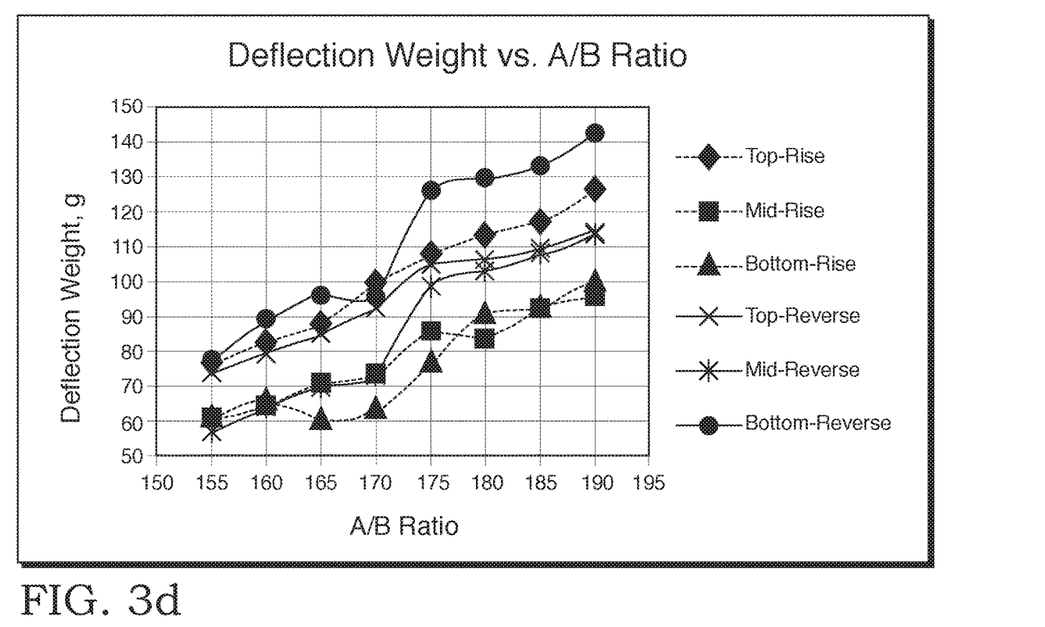

The equipment set-up used to measure foam stiffness is illustrated in FIG. 1. In this test, a "button" 10 was placed on the center of a scale 20. The foam slice 30 was placed horizontally across scissor jacks 40 that were placed one on each side of the scale 20 such that there was a 1 cm gap between the bottom surface of the foam slice 30 and the button 10. A metal rod and a plastic cup 50 were placed on top of the foam slice 30. The stiffness test consisted of pouring water into the cup 50, thereby causing the foam slice to bend down towards the scale set to zero. When the foam came into contact with the button 10 such that the scale 20 began to measure weight, the cup 50 was removed was weighed on another scale. The weight of the water (in grams) in the cup 50 was then recorded as the amount needed to flex the foam the required distance. The same foam slice 30 was then flipped over and the procedure repeated to provide deflection weight results, as a function of ISO/OH Index, on both the "Rise" direction and the "Reverse" direction. The process was also repeated for each bun produced at slices #3 (top), #8 (mid) and #13 (bottom). Results are illustrated in FIGS. 2 and 3.

The results illustrate that significant differences in foam density were observed between slices taken from the bottom of the bun and the mid and top sections of the bun. The results also illustrate that dramatic improvements in foam stiffness were observed from slices taken from the bottom of the bun when the slice is tested after re-orienting the slice so that the deflection weight is placed again the base facing surface of the slice, as compared to the foam rising surface of the slice. As a result, it is believed that by re-orienting, such as flipping, a foam bun or foam slice and inserting a foam laminate containing the foam slice into a mold such that the foam rise direction faces a concave surface of a resulting concave surface-containing foam laminate, variations in foam stiffness can be reduced significantly based on the location from which the foam slice was taken from the bun. As a result, it is also believed that foams having lower density, but sufficient stiffness, can be produced using the methods of the present specification, even using foam slices taken from the bottom portion of the bun, proximate to the base side of the bun.

This specification has been written with reference to various non-limiting and non-exhaustive embodiments. However, it will be recognized by persons having ordinary skill in the art that various substitutions, modifications, or combinations of any of the disclosed embodiments (or portions thereof) may be made within the scope of this specification. Thus, it is contemplated and understood that this specification supports additional embodiments not expressly set forth herein. Such embodiments may be obtained, for example, by combining, modifying, or reorganizing any of the disclosed steps, components, elements, features, aspects, characteristics, limitations, and the like, of the various non-limiting embodiments described in this specification. In this manner, Applicant(s) reserve the right to amend the claims during prosecution to add features as variously described in this specification, and such amendments comply with the requirements of 35 U.S.C. § 112, first paragraph, and 35 U.S.C. § 132(a).

What is claimed is:

1. A method for making a foam laminate having a concave surface, comprising:
    (a) placing a foam sheet-containing sandwich structure into a mold, the foam sheet-containing sandwich structure comprising a foam sheet having two opposed major surfaces and a facing attached to each of the two opposed major surfaces, the foam sheet being a slice from a foam bun produced by a discontinuous box-foam process in which a foam-forming composition is deposited onto a base of a box in which a foaming reaction occurs such that the foam rises in a direction away from the base, such that one major surface of the sheet is a foam rise direction facing surface and an opposed major surface of the sheet is a base facing surface; and
    (b) shaping the laminate in the mold to form the foam laminate having a concave surface, wherein the foam laminate is oriented in the mold so that the shaping forms the foam laminate having the concave surface wherein the foam rise direction facing surface of the foam sheet faces the concave surface of the foam laminate.

2. The method of claim 1, wherein the foam laminate having a concave surface is an automotive headliner.

3. The method of claim 1, wherein the foam sheet comprises an open-celled polyurethane foam.

4. The method of claim 1, further comprising, prior to step (a), coating at least one major surface of the foam sheet with an adhesive and applying a facing to the foam sheet to form the sandwich structure.

5. The method of claim 4, wherein the foam laminate further comprises a textile cover layer, an additional foam layer, an additional adhesive layer, and/or a scrim layer.

6. The method of claim 3, wherein the open-celled polyurethane foam is obtained by reacting a polyisocyanate component with a polyol component, wherein the polyol component comprises:
    (i) a polyether polyol having a functionality of from 2 to 6 and a number average molecular weight of more than 160 to 6500;
    (ii) a chain extending agent and/or crosslinking agent containing at least two isocyanate-reactive groups and having a molecular weight of from 60 to 160,
    (iii) water, and
    (iv) a catalyst for polyurethane formation.

7. The method of claim 6, wherein the polyisocyanate component comprises a mixture of a diphenyl methane diisocyanate and a polyphenyl polymethylene polyisocyanate comprising from 40 to 85% by weight of a diphenyl methane diisocyanate and from 15 to 40% of a polyphenyl polymethylene polyisocyanate, based on the total weight of polyisocyanate.

8. The method of claim 6, wherein the polyol component comprises:
    (i) 15 to 40% by weight, based on the total weight of the polyol component, of a polypropylene oxide-based polyether diol having an OH number in the range of from 450 to 600;
    (ii) 30 to 50% by weight, based on the total weight of the polyol component, of a poly(propylene/ethylene oxide) glycerin-initiated polyether triol having an OH number in the range of from 26 to 34; and
    (iii) 10 to 30% by weight, based on the total weight of the polyol component, of a polypropylene oxide-based polyether triol having an OH number in the range of from 400 to 550.

9. The method of claim 1, wherein the foam bun or foam slice is flipped before placing the foam containing sandwich structure into the mold.

10. The method of claim 1, wherein the foam slice is taken from the bottom 30% of the height of the bun, proximate to the base side of the bun.

11. The method of claim 1, wherein the foam slice is taken from the bottom 10% of the height of the bun, proximate to the base side of the bun.

12. A method for making a foam laminate having a concave surface comprising:
    (a) producing an open-celled polyurethane foam bun having a height of 3 to 4 feet by a discontinuous box-foam process in which a foam-forming composition is deposited onto a base of a box such that as a foam-forming reaction occurs the foam rises in a direction away from the base;
    (b) allowing the foam bun to cool;
    (c) slicing the foam bun to produce a foam sheet having a thickness of ¼ inch to 1 inch and having two opposed major surfaces, wherein one major surface of the sheet is a foam rise direction facing surface and the other major surface is a base facing surface;
    (d) coating at least one major surface of the foam sheet with an adhesive;
    (e) applying a facing to the foam sheet to form a sandwich structure;
    (f) placing the sandwich structure into a mold; and
    (g) shaping the sandwich structure in the mold to form the foam laminate having a concave surface, wherein, prior to placing the sandwich structure in the mold, the sandwich structure is re-oriented so that when the sandwich structure is placed in the mold and shaped, the shaping forms the foam laminate having the concave surface wherein the foam rise direction facing surface of the foam sheet faces the concave surface of the foam laminate.

13. The method of claim 12, wherein the foam laminate having a concave surface is an automotive headliner.

14. The method of claim 12, wherein the foam bun or foam slice is flipped before placing the foam containing sandwich structure into the mold.

15. The method of claim 12, wherein the foam slice is taken from the bottom 10% of the height of the bun, proximate to the base side of the bun.

16. The method of claim 1, wherein the mold comprises platens heated to 90 to 130° C. during the shaping.

17. The method of claim 1, wherein the sandwich structure is heated in an oven at 160-200° C. and the shaping occurs in a mold at a temperature of 40-60 C.

18. The method of claim 1, wherein the foam bun has a height of 3 to 4 feet.

19. The method of claim 1, wherein the foam sheet has a thickness of ¼ inch to 1 inch.

* * * * *